United States Patent
Kong et al.

(10) Patent No.: US 6,612,356 B2
(45) Date of Patent: Sep. 2, 2003

(54) APPARATUS FOR IMPROVING FILM MACHINABILITY DURING FILM SEALING

(75) Inventors: Dan-Cheng Kong, Fairport, NY (US); Richard A. Rehkugler, Fairport, NY (US); Donald F. Sexton, Newnan, GA (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/829,745

(22) Filed: Apr. 10, 2001

(65) Prior Publication Data

US 2002/0144777 A1 Oct. 10, 2002

(51) Int. Cl.[7] .............................................. B29D 23/00
(52) U.S. Cl. ..................... 156/461; 156/466; 156/583.1; 156/203; 156/218; 156/308.4; 53/451; 53/459; 53/477; 493/269; 493/189; 493/243
(58) Field of Search ................................. 156/203, 218, 156/308.4, 466, 583.1, 580, 583.2, 583.3, 461; 53/451, 450, 459, 477, 550–553, 554–555; 493/269, 189, 302, 243, 197

(56) References Cited

U.S. PATENT DOCUMENTS

| | | | | |
|---|---|---|---|---|
| 3,623,942 A | * | 11/1971 | Yerrick ......................... 428/101 |
| 4,310,369 A | * | 1/1982 | Miller et al. ................... 156/218 |
| 4,359,361 A | * | 11/1982 | Wright ......................... 235/381 |
| 4,842,893 A | | 6/1989 | Yializis et al. ................. 427/44 |
| 4,853,602 A | | 8/1989 | Hommes et al. ............... 318/38 |
| 4,950,345 A | | 8/1990 | Kreager, Jr. et al. .......... 156/203 |
| 5,085,036 A | * | 2/1992 | Evans et al. .................... 53/550 |
| 5,321,230 A | * | 6/1994 | Shanklin et al. .............. 219/492 |
| 5,326,416 A | | 7/1994 | Perrett ......................... 156/251 |
| 5,350,610 A | * | 9/1994 | Mashita et al. ............. 428/35.7 |
| 5,369,936 A | | 12/1994 | Callahan et al. ............... 53/415 |
| 5,415,721 A | * | 5/1995 | Nickey et al. ............... 156/447 |
| 5,415,724 A | | 5/1995 | Perrett ....................... 156/583.2 |
| 5,746,043 A | | 5/1998 | Terminella et al. ............ 53/451 |
| 5,840,419 A | | 11/1998 | Alder ......................... 428/327 |
| 6,025,079 A | * | 2/2000 | Ciocca et al. ................ 428/515 |

* cited by examiner

*Primary Examiner*—Michael W. Ball
*Assistant Examiner*—Jessica Rossi
(74) *Attorney, Agent, or Firm*—Rick F. James; Keith A. Bell

(57) ABSTRACT

A back-up pad is provided over an anvil surface of a back-up plate, and between the anvil surface and a sealing surface of a sealing die, in an apparatus for forming seals between layers of film material. The back-up pad has a slip layer on one side thereof and a firm polymeric support layer on an opposite side thereof, the slip layer opposing the sealing face of the die so that the layers of film material pass between the sealing die and the back-up pad during seal formation. The polymeric support layer may have a Shore-A hardness of at least 10 at 20° C. and a dynamic loss tangent of less than 0.1 from 20° C. to 80° C. An example of a support layer is a polycarbonate pad, and an example of slip layer is a glass cloth coated with Teflon™. The back-up pad is particularly useful for forming lap seals in relatively thick film materials, such as laminated films having multi-layered films laminated together.

5 Claims, 5 Drawing Sheets

APPARATUS FOR IMPROVING FILM MACHINABILITY DURING FILM SEALING

BACKGROUND

An improved back-up pad is provided for an apparatus for forming seals between film materials, such as in packaging.

The Kreager et al U.S. Pat. No. 4,950,345 describes an apparatus for forming seals between film materials, such as in packaging.

Bags for potato chips or other snack food products typically are formed, filled and sealed in a substantially continuous operation. To produce a bag, polymeric sheet material typically is formed into a tube by bringing the edges of the material into engagement as the material passes over a tube-forming collar. A portion of the tube corresponding to an end of a bag is gripped and sealed by jaws to form a closed-end tube. The jaws move downward, pulling the closed-end tube past a device which seals the engaged edges of the tube between a sealing die and a back-up plate by application of heat and pressure to the edges to form a back seal along the closed-end tube. The closed-end tube may be filled with product from a suitable device at substantially the same time that it is being back-sealed, or immediately thereafter. The jaws then release the sealed end and move upward along the length of the closed-end tube. The jaws stop and close together at a point corresponding to the opposite end of a product-filled bag to seal the end of the tube containing product to form the filled bag. The jaws simultaneously seal the end of the next tube and then move downward to effect the back seal of the newly-formed, close-end tube. The formed bag may be separated from the continuous material when the jaws are at their lowermost position.

During movement of the jaws downwardly while gripping the closed-end tube, the engaged edges of the tube are moved quickly past the back-sealer to form a "slip" area of the back seal. However, when the tube remains stationary after the jaws release the sealed end and move upward along the length of the closed-end tube, a portion of the engaged edges of the tube remain stationary, and within the sealing device for considerably longer than during movement of the tube, to form a "dwell" area of the back seal. Because of this variation in the residence time of tube edges within the back sealing device, the quality of the "dwell" and the "slip" areas of the seal often are inconsistent, particularly with certain types of film material. This may result in defectively sealed bags.

In the sealing apparatus of the Kreager et al U.S. Pat. No. 4,950,345, the sealing die has a sealing face, and the back-up plate has an anvil surface that opposes the sealing face of the die. A back-up pad is provided over the anvil surface of the back-up plate. The back-up pad has a slip surface on one side thereof and a spring surface on an opposite side thereof, the slip surface opposing the sealing face of the die so that the layers of film material pass between the sealing die and the slip surface of the back-up pad during seal formation. The spring surface of the back-up pad includes a plurality of inwardly extending resilient spring loops that act against the anvil surface during seal formation. The spring loops resiliently urge the layers of film material against the sealing face of the sealing die to affect seal formation between the film layers while cushioning the film layers to prevent damage to the film layers due to drag between the film layers and the die face.

Defectively sealed bags often go undetected until the product moves into retail commerce. The customer may buy the package and be quite unaware that it has a defective seal. The faulty seal, however, may have caused the product to lose freshness, and the customer is dissatisfied. Also, the customer may return the product to the store for exchange or a refund. Since by this time the whole chain of commercial transactions has occurred, the refund or exchange is generally accounted for by some type of back transactions giving credit to the retailer, route man and the like until reaching the product manufacturing stage. This is a costly and time-consuming process. Accordingly, there remains a need in the art for methods and apparatus for forming consistently high quality back seals in form and fill machines.

SUMMARY

There is provided an apparatus for longitudinally sealing a tube formed from polymeric plastic sheet film material, comprising a sealing die and a back-up plate between which layers of polymeric film pass for forming a seal between the film layers, the sealing die having a sealing face and the back-up plate having an anvil surface that opposes the sealing face of the die, the apparatus further including a back-up pad over the anvil surface of the back-up plate, the back-up pad having a slip layer on one side thereof and a polymeric support layer on an opposite side thereof, the slip layer opposing the sealing face of the die so that said layers of film material pass between the sealing die and the back-up pad during seal formation, the polymeric support layer comprising a polymeric material with a Shore-A hardness of at least 10 at 20° C. and a dynamic loss tangent of less than 0.1 from 20° C. to 80° C.

There is also provided a method for using this apparatus to longitudinally seal a tube formed from polymeric plastic sheet film material, said method comprising the steps of:

(a) passing layers of said plastic sheet film between a sealing face and a back-up plate;

(b) pressing the layers of step (a) together between said sealing face and said back-up plate; and (c) forming a heat seals from heat supplied by said sealing face.

DETAILED DESCRIPTION

The present invention is applicable to bag forming machines that form a continuous sheet of film material into a tube with edges of the tube overlapping and engaged prior to sealing the engaged edges by heat sealing or other suitable means. The invention is applicable to devices that form "lap" type seals, as well as devices that form fold over or "fin" seals. Such machines include "drag" type, "reciprocated drag" type, "reverse reciprocated intermittent" type or "continuous motion" type package maker system using lap or fin seal configurations.

The present apparatus includes a back-up pad comprising a slip layer and a polymeric support layer. The slip layer may be a glass cloth coated with Teflon™ (i.e. polytetrafluoroethylene).

The polymeric support layer has a Shore-A hardness of at least 10 at 20° C. and a dynamic loss tangent of less than 0.1 from 20° C. to 80° C. Shore-A hardness may be measured with a durometer according to ASTM D2240. Dynamic loss tangent may be measured with vibron according to ASTM D4065-95. An example of such a vibron is a Rheovibron made by Toyo Baldwin, Japan.

The dynamic loss tangent of polycarbonate is about 0.002 to 0.01 at 110 Hz from 23° C. to 80° C. In the present embodiments, a low dynamic loss tangent for the polymer support gives better rebound for lap sealed film, facilitating easy sliding through the forming tube.

The polymeric support layers may be free of void spaces, such as those found in foam rubber or Velcro™ strips.

A particular polymeric support layer is a polycarbonate pad. However, the polycarbonate of this layer may be replaced by other materials of similar hardness and dynamic loss tangent, such as alloys of polycarbonate and polytetrafluoroethylene (PTFE) and cross-linked rubber compositions, especially those having a Shore-A hardness of greater than 10 at 20° C. Further examples of materials for the polymeric support layer include an alloy of polycarbonate and polyethylene terephthalate, glass fiber reinforced epoxy, glass fiber reinforced polyester and polycarbonate-silicone rubber block copolymer.

Figure 1:
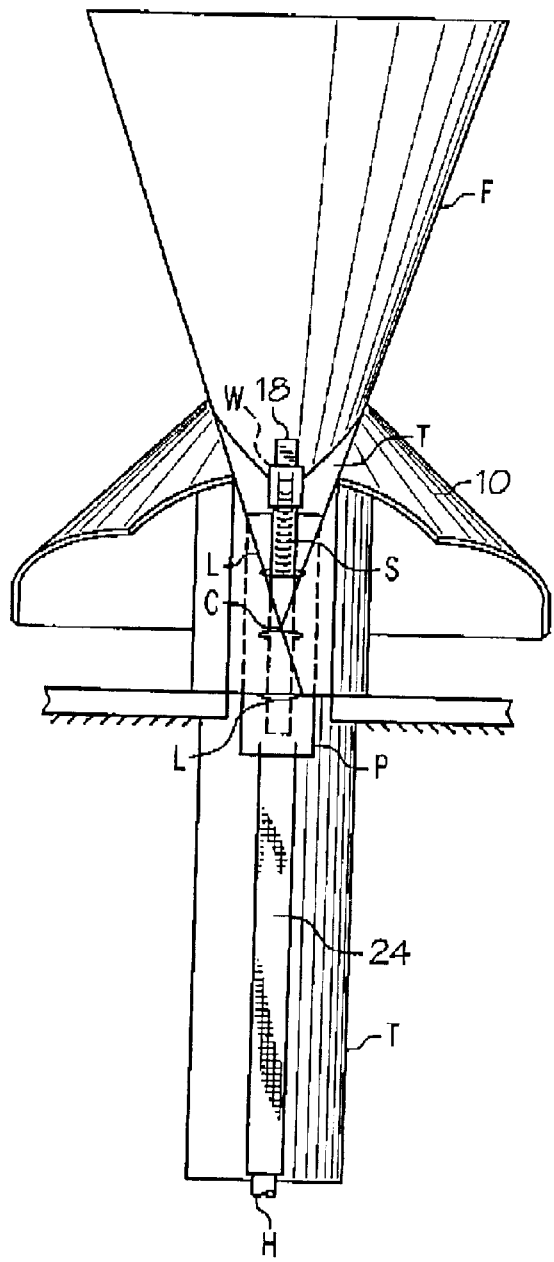
FIG. 1 is an elevation view showing a bag forming apparatus with sealing die removed, utilizing a back-up pad in accordance with one embodiment of the present invention for continuous back seal formation between polymeric film layers.
Figure 3:
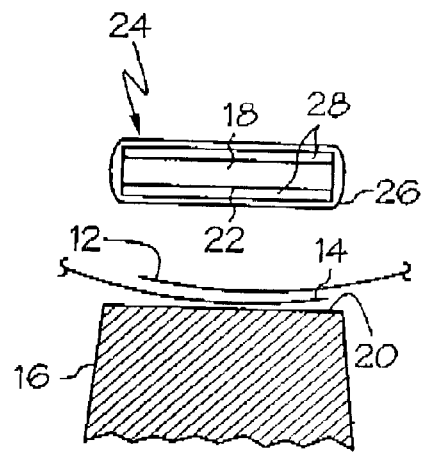
FIG. 3 is a cross-sectional view of a back-up pad installed on a back-up plate in accordance with one embodiment of the present invention.

The invention is shown in the environment of one such bag forming device in FIG. 1. The apparatus shown in FIG. 1 includes a conventional tube forming collar 10 over which bag forming polymeric sheet material passes as it is formed into a tube with overlapping edges 12 and 14 of the polymeric film for forming a "lap" seal as shown in FIG. 3. The film material can be any suitable sealable film or sheet material known in the art for forming bags for snack food items and the like.

The overlapped layers of polymeric film are drawn between a heated sealing die 16 and a back-up plate 18 which, accordingly to this embodiment, is in the form of a tension band. The tension band back-up plate 18 is mounted on a funnel/fill tube assembly that guides food product into the bags as they are formed. The funnel/fill tube assembly includes a funnel portion F, generally of metal, welded to a product fill tube T that extends within the polymeric tube of bag-making material.

The tension band back-up plate 18 includes a lower hook H (shown in detail in FIG. 6) that engages the bottom edge of fill tube T. Plate 18 further includes an angularly slotted top portion having slots S that threadably engage a complementary worm screw W mounted on a support that is welded to the forward junction of the funnel F and the product fill tube T. In the arrangement shown in FIGS. 1 and 6, tightening of worm screw W increases the tension on back-up plate 18.

With reference to FIG. 3, the sealing die 16 has a heated sealing face 20 that opposes an anvil surface 22 of the back-up plate 18.

In accordance with the present invention, a back-up pad 24 is provided over the anvil surface 22 of back-up plate 18. The back-up pad 24 has a slip surface 26 on one side thereof and a polymeric support layer 28 on an opposite side thereof.

As shown in FIG. 3, the slip surface 26 of back-up pad 24 opposes the sealing face 20 of die 16 so that the overlapping layers of film material pass between the sealing die and the back-up pad during seal formation. In the embodiment of FIG. 3, the back-up plate 18 is sandwiched between two polymeric support layers 28, which are, in turn, wrapped with a slip layer 26, such as a layer of Teflon™ tape. The polymeric support layers 28 serve to minimize heat losses to their supporting mounting band or the more massive standard back-up fill tube anvil surfaces. The amount of heat required to seal may therefore be reduced as transmission is mainly directed to the film plies to be sealed.

The second polymeric support layer 28, opposite the sealing side of the back-up pad 24, may be, optionally, omitted. However, it will be noted that the two-sided sleeve shown in FIG. 3 can be reversed, when the first side becomes worn.

Figure 2:
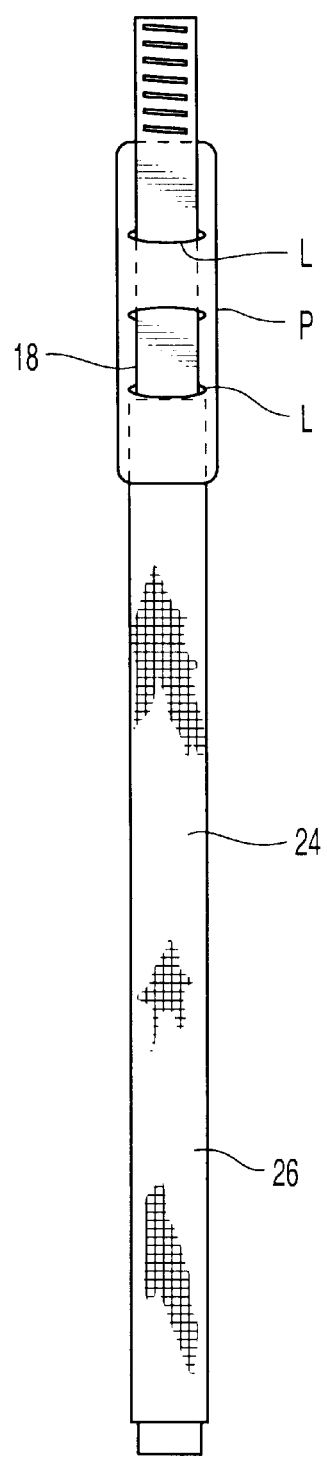
FIG. 2 is a detailed elevation view of a back-up pad in accordance with the present invention installed on a back-up plate, as in the embodiment shown in FIG. 1.
Figure 6:
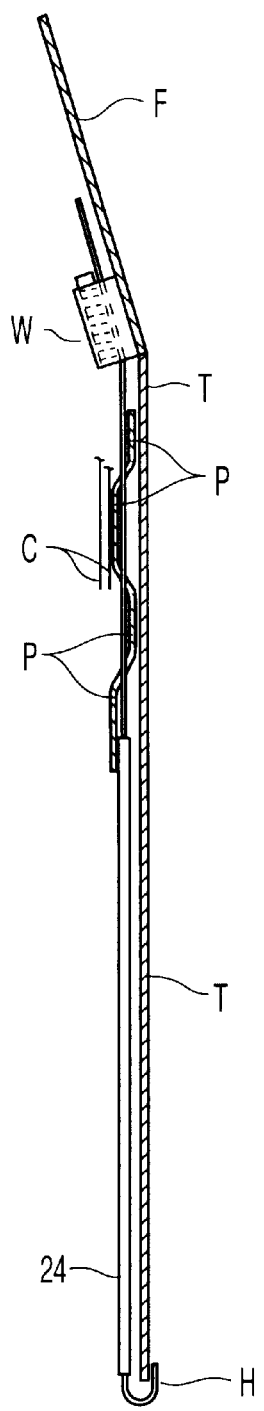
FIG. 6 is a schematic cross-sectional view of the mounting of a tension band back-up plate on the apparatus shown in FIG. 1.

In particularly preferred embodiments, a flexible shield P, preferably all polyester, is mounted on the tension band back-up plate 18 in the region of the bag former cross-over area C. Shield P is mounted on plate 18 by snaking the plate 18 through slots L in the shield. As shown in FIGS. 1, 2 and 6, the lower portion of shield P extends over the top portion of the back-up pad 24. Shield P assists in the passage of the packaging film over the pad mounting plate 18 as it enters and exists the former cross-over area C, and provides a smooth transition for the film as it is pulled down initially over the surface of back-up pad 24.

The heated die face or platen 20 can be of any suitable size. Beneficially, it should not be wider than the desired seal. Applications of heat and pressure to the die face or platen 20 is based on the seal requirements of the particular packaging film being used. Generally, the sealing temperature is no greater than about 177° C. (about 350° F).

Figure 4:
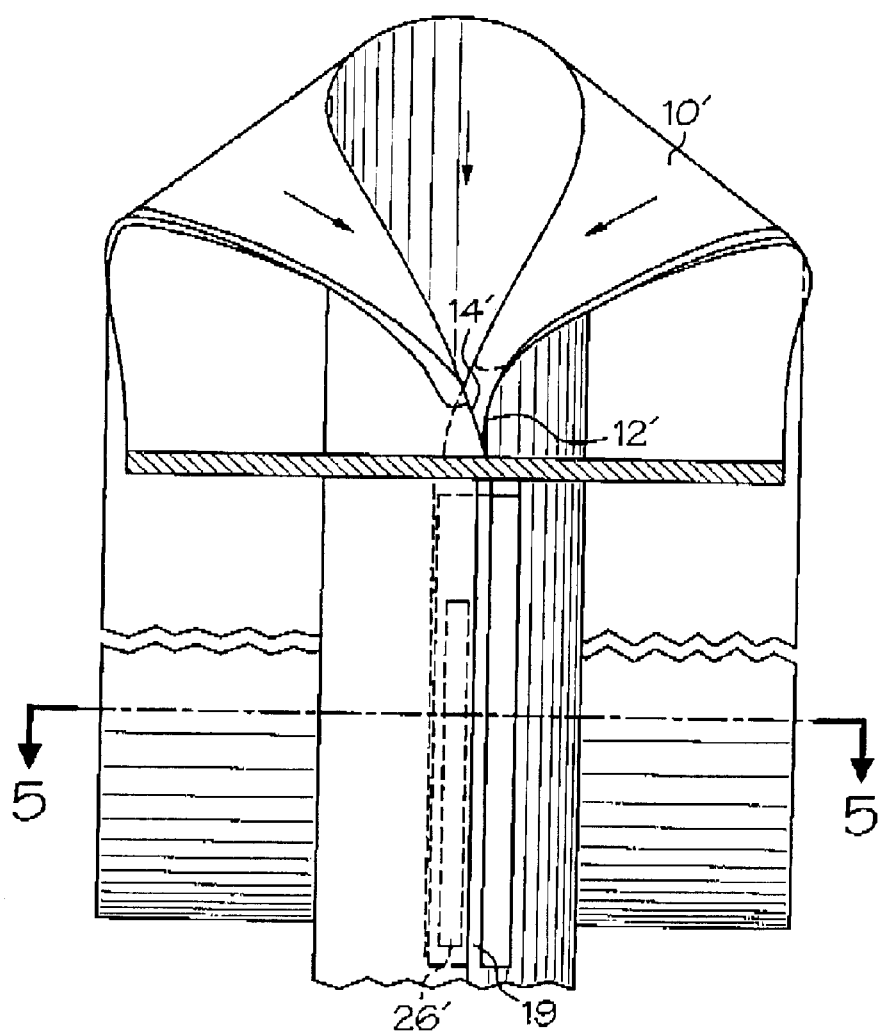
FIG. 4 is an elevation view showing utilization of a back-up pad in accordance with a second embodiment of the invention.
Figure 5:
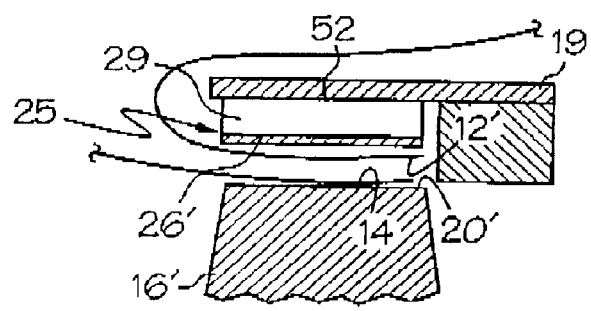
FIG. 5 is a cross-sectional view along line 5—5 of FIG. 4.

In the embodiment shown in FIGS. 4 and 5, a modified form of the invention is utilized in an apparatus for forming a foldover or "fin"-type back seal. As in the previous embodiment, the apparatus includes a conventional tube forming collar 10'.

Edges 12' and 14' of the polymeric film are folded over and layered to form a "fin," and passed between a sealing die 16' and a back-up "tucker" plate 19 for forming the back seal. In this embodiment, the back-up pad 25 is bound to plate 19 with an adhesive. In particular, a back-side 52 of a polymeric support layer 29 is coated with adhesive and applied to the anvil surface of the back-up "tucker" plate 19. To this polymeric support layer 29 is applied, via an adhesive, a slip layer 26'. Thus, the back-up pad 25 has a slip layer 26' on one side thereof and a polymeric support layer 29 on an opposite side thereof. As shown in FIG. 5, the slip layer 26' of back-up pad 25 opposes the sealing face 20' of die 16' so that the layers of film material pass between the sealing die and the back-up pad during seal formation.

Figure 7:
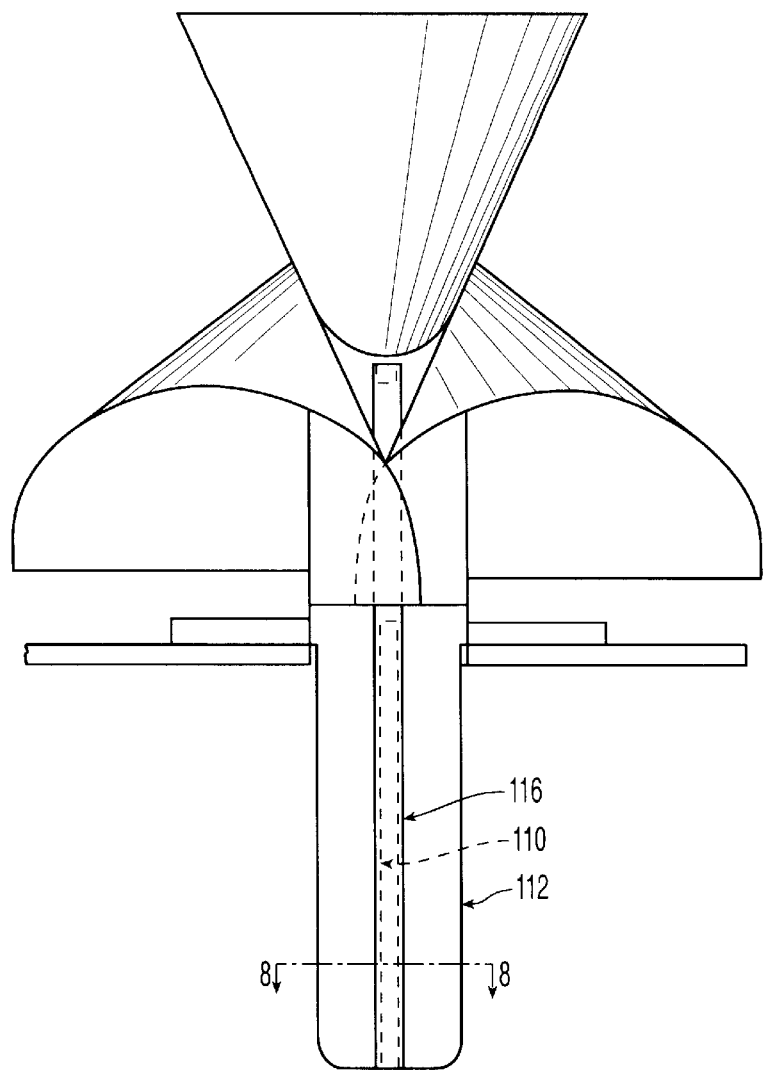
FIG. 7 is a partly schematic, elevation view showing a bag-forming apparatus with sealing die removed, utilizing a back-up pad in accordance with another embodiment of the present invention for forming lap-type seals.
Figure 8:
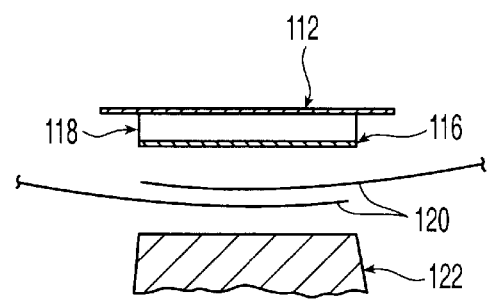
FIG. 8 is a cross-sectional, partly schematic view along line 8—8 of FIG. 7, with the sealing die in place.

FIGS. 7 and 8 illustrate a two-piece back-up pad 110 in an apparatus for forming lap-type seals. According to this embodiment, a back-up pad 110 is adhesively and/or mechanically attached, via one surface of a polymeric support 118, to the working surface of anvil 112. The other surface of the polymeric support 118 of the back-up pad 110 is adhesively and/or mechanically attached to a slip layer 116. In the embodiment shown in FIGS. 7 and 8 the back-up pad 110 facilitates sealing of the polymeric film layers 120 between the anvil 112 and the sealing die 122.

Figure 9:
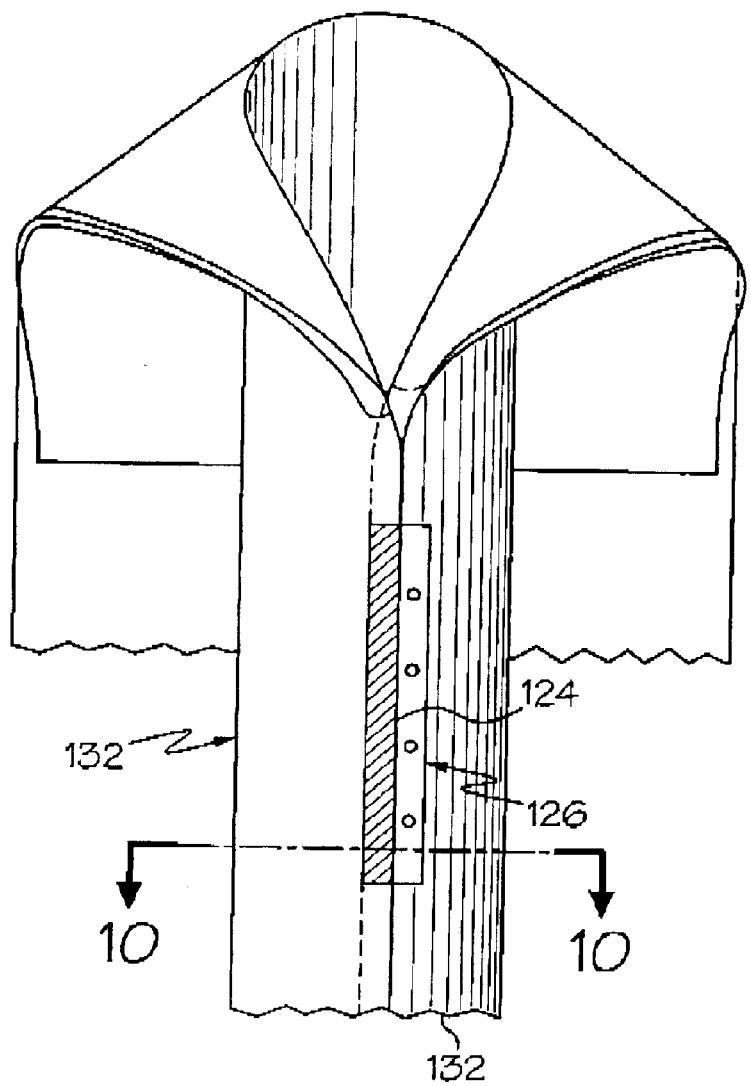
FIG. 9 is a partly schematic, elevation view showing a bag-forming apparatus, with sealing die removed, of another embodiment of the invention for forming fin-type seals.
Figure 10:
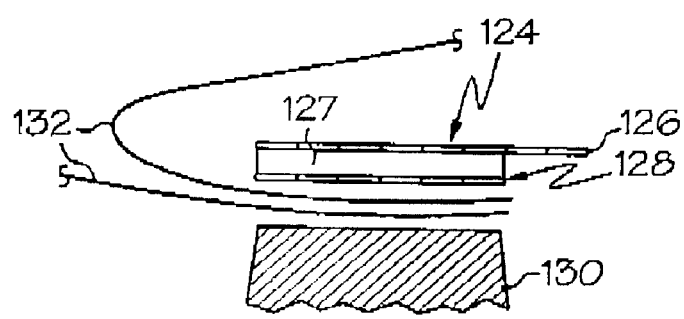
FIG. 10 is a partly schematic, cross-sectional view along line 10—10 of FIG. 9, with the sealing die in place.

In the embodiment shown in FIGS. 9 and 10, yet another modified form of the invention is utilized in an apparatus for forming a fold over or fin-type back seal. According to this embodiment, a back-up pad 124 is adhesively and/or mechanically attached to a tucker plate 126. The backup pad 124 includes a polymeric support layer 127 and a slip layer 128. The polymeric film layers 132 are sealed between the sealing die 130, and the surface of the slip layer 128.

The films which are sealed by apparatus described herein may be relatively thick, for example, having a thickness of at least 2.0 mil. Such films may be produced by laminating two or more multi-layer films together. These multi-layer films may each include at least three layers.

The layers of the multi-layer films may be formed from one or more thermoplastic materials, such as polyolefins. Such polyolefins include homopolymers and copolymers, including terpolymers, of one or more olefins, having from 2 to 10 carbon atoms, such as ethylene, propylene and butene.

One or more core layers may comprise a thermoplastic polymer which has properties suitable for extrusion or coextrusion. The extruded or coextruded film may be biaxially oriented in the machine and transverse directions under elevated temperature so as to form a multi-layer film. A preferred thermoplastic polymer of a core layer is a polypropylene homopolymer.

Skin layers may have heat sealable properties. Copolymers used in skin layers include random copolymers, for example of ethylene and propylene. Terpolymers are exemplified by ethylene-propylene-butene-1 terpolymers. Also, heat sealable blends can be utilized in providing this layer. Thus, along with the copolymer or terpolymer there can be polypropylene homopolymer or other material which does not impair the heat sealability of this layer.

Skin layers may comprise a polypropylene homopolymer, such as highly crystalline polypropylene (HCPP), which may help to improve release properties of the film. HCPP polypropylene polymers include those having a decalin solubles content of less than about 5% by weight, meso pentads equal to or greater than about 85% ($^{13}$C NMR spectroscopy), and a melt flow of about 2.5 to about 3 (as measured according to the standard ASTM D1238 test for polypropylene). Suitable commercially available HCPP polymers include, but are not limited to, Amoco 9218 HCPP resin from BP-Amoco.

The multi-layer film may have one or more additional layers, such as a tie layer, in addition to the core and skin layers. It is also possible to have two metallizable skins if vapor deposition on both sides of the film is desired.

Sometimes it is useful to enhance or provide the film with certain properties by use of appropriate film additives. Such additives are used in effective amounts, which vary depending upon the property required, and may be selected from the group consisting of: antistatic, antiblock, slip, or antioxidant additives. These additives may be added to one or more layers of the film.

Either of the skin layers of the film, especially a non-metallized or sealable layer, can optionally contain a minor amount of antiblock particles, such as clays, talc, glass, and others. One antiblock material can be used alone, or different sizes and shapes can be blended to optimize machinability. The major proportion of the particles, for example, more than half, may be of such a size that a significant portion of their surface area, will extend beyond the exposed surface of such skin layer. Suitable antiblocks include, but are not limited to, fully cross-linked non-meltable polymethyl methacrylate (PMMA) particles, such as EPOSTAR™ MA-1002, or silica ($SiO_2$) particles, such as SYLOBLOC 44 from W. R. Grace, or fully cross-linked or non-meltable polysiloxane micro-spheres, such as TOSPEARL T120A, from Toshiba Silicone Company, Ltd. Partially cross-linked polysiloxane particles, which release non-crosslinked liquid silicone under stress, as described in U.S. Pat. No. 5,840,419, can also be used. The solid antiblock may be incorporated into the layer in an amount ranging from about 0.1 to about 0.5% by weight, preferably from about 0.15 to about 0.30% by weight, based on the entire weight of the layer.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines. The antistatic agent may be glycerol monostearate (GMS) or a blend of GMS and tertiary amine.

Slip additives include higher aliphatic acid amides, higher aliphatic acid esters, waxes and metal soaps, which can be used in amounts ranging from about 0.1 to about 2 weight percent, based on the total weight of the layer. A specific example of a fatty amide slip additive is erucamide. Optionally, one or more layers are compounded with a wax for lubricity. Amounts of wax range from about 1 to about 15 weight % based on the total weight of the layer. Waxes and slip additives tend to migrate towards the surface of the film. If, prior to metallization, they migrate to the metallizable surface, or they migrate to the opposite surface and are transferred to the metallizable surface by contact, metal adhesion may be impaired. Therefore, it may be necessary to include such additives in a core or tie layer, and not directly in either of the skin layers, to delay their migration. It may further be necessary to minimize the delay between film manufacture and metallization.

Antioxidants, such as phenolic antioxidants, may be used in amounts ranging from about 0.1 weight % to about 2 weight percent, based on the total weight of the layer. An example of an antioxidant is commercially available under the trademark IRGANOX 1010.

The multi-layer film may also comprise coatings, such as an adhesive layer (e.g., a water-based urethane coating), and/or a cold seal layer (e.g., Technical Coatings 30061A, which is a pattern applied coating comprising polyisoprene and ethylene-vinyl acetate copolymer), as is well known in the art.

The film may be formed by coextruding the thermoplastic polymer-containing core layer together with the at least one skin layer and optional additional layers through a flat sheet extruder die at a temperature ranging from between about 200 to about 275° C., casting the film onto a cooling drum and quenching the film. The sheet may then be stretched about 4 to about 6 times in the machine direction (MD)

between rolls, and then stretched about 6 to about 10 times in the transverse direction (TD) in a tenter. Alternatively, the MD and TD stretches may occur more or less simultaneously by means of suitable machinery, such as described in U.S. Pat. No. 4,853,602. The film may then be wound onto a reel. Optionally, one of the external surfaces is coated or flame or corona treated before winding (i.e., the surface of the functional skin layer). In addition, the production process may also include coating an adhesive and/or cold seal layer on one or both surfaces of the multilayer polymeric film.

The core layer may represent about 50 to about 90 percent of the thickness of the total multilayer polymeric film. The skin layers are usually coextensively applied to each major surface of the core layer, typically by coextrusion, as noted above. However, skin layers arrived at by coextrusion may not, ultimately, be the outermost layers.

Metal layers are known in the art, and can be deposited using any known method, for instance, vacuum deposition, electroplating, sputtering, etc. Preferably, the metal layer is one of vacuum deposited aluminum, copper, silver, chromium, gold, and mixtures thereof, with vacuum deposited aluminum being most preferred. A protective acrylic or other polymeric coating may be deposited over the metal layer under vacuum, preferably in the metallization machine, as taught, for example, by U.S. Pat. No. 4,842,893.

A polymeric film may be laminated to the metal layer of the multi layer film to protect the metal from scratching and scuffing during use. Such polymeric film can improve the gauge, stiffness and puncture resistance of the overall film, and can further enhance the barrier properties of the film. The polymeric film can be oriented, unoriented, transparent or opaque. The polymeric film laminated to the metal layer may be a multi-layer film including at least one layer of polypropylene or polyethylene, especially oriented polypropylene (OPP). Such an additional polymeric film can be laminated to the metal layer using any suitable adhesive. A particular adhesive is a hot melt low density polyethylene, applied in an amount of about 10 pounds per ream.

In the Example and Comparative Examples which follow, lap seals were formed using two different multi-layer laminated films. These films are referred to herein as Film A and Film B.

FILM A

A laminated film structure was prepared from a metallized cast polypropylene film laminated with polyurethane adhesive to a 70 gauge (18 um) biaxially oriented polypropylene (BOPP) film, available from Mobil Chemical Company as 70SPW-L. The cast polypropylene film was CPP2500, which is a commercial film made by Futamura, Japan.

FILM B

A laminated film structure was prepared from a oriented polypropylene (OPP) film, having four coextruded biaxial oriented layers, laminated with polyurethane adhesive to a 90 gauge (23 um) biaxially oriented polypropylene (BOPP) film, available from Mobil Chemical Company as 90SPW-L. The order of layers in the (OPP) film is referred to herein as A/B/C/D for the four layers. Skin layer A was prepared from an ethylene-propylene copolymer. Inner layer B was prepared from a polypropylene homopolymer. Inner layer C was prepared from an ethylene-propylene-butene-1 terpolymer. Outer layer D was prepared from an ethylene-propylene-butene-1 terpolymer.

The four-layered film was oriented about 5 times in the machine direction and eight times in the transverse direction by the tenter frame process. The film was surface treated by a flame treatment.

The laminate layer structure was 70SPW-L/adhesive/E/F/G/H.

In the Example and Comparative Examples which follow, lap seals were formed over a range of temperatures. The seals were tested and an operating temperature range was established. The operating temperature range was the range of temperatures over which satisfactory seals were formed.

COMPARATIVE EXAMPLE A

A two-layer back-up pad 110 similar to that shown in FIGS. 7 and 8 was formed by affixing a foam rubber support 118 to anvil 112 by a pressure sensitive adhesive. The rubber in this support was a silicone rubber, and the foam rubber had a Shore A hardness of less than 10 at 20° C., and, thus, was softer than the support called for in the present invention. The other surface of the foam rubber support was then affixed to a slip layer 116 with a pressure sensitive adhesive. The slip layer was made from a Teflon™ (i.e. polytetrafluoroethylene) coated glass cloth.

This back-up pad was used to form lap seals in a Hayssen VFFS machine having the general configuration shown in FIG. 7. When Film A was used, the operation temperature was determined to be 270° F. (132° C.). When Film B was used, the operation temperature range was determined to be 240° F. to 250° F. (115° C. to 121° C.).

COMPARATIVE EXAMPLE B

A three-layer back-up pad, having a layer of foam rubber, a layer of a Teflon™ coated glass cloth, and a layer of a Velcro™ strip, was formed by first affixing the foam rubber support of Comparative Example A to the anvil of Comparative Example A by a pressure sensitive adhesive. The other surface of the foam rubber support was then affixed to a Teflon™ (i.e. polytetrafluoroethylene) coated glass cloth. The other surface of the Teflon™ coated glass cloth was then adhered to an all polyester Velcro™ strip. It will be understood that Velcro™ strips are constructed as two different types, one with a surface of small hooks and the other with a surface of clinging pile. In Comparative Example B, the Velcro™ strip had a surface of small hooks, and the strip was attached to the Teflon™ coated glass cloth in a manner such that the hooks faced outward, away from the anvil surface.

This back-up pad was used to form lap seals in a Hayssen VFFS machine having the general configuration shown in FIG. 7. In particular, the seals were formed between the heated surface of the heating die and the surface of small hooks on the Velcro™ strip. When Film A was used, the operation temperature range was determined to be 270° F. to 280° F. (132° C. to 138° C.). When Film B was used, the operation temperature range was determined to be 240° F. to 280° F. (115° C. to 138° C.).

COMPARATIVE EXAMPLE C

A one-layer back-up pad, having a single layer of a Teflon™ coated glass cloth, was formed by affixing a layer of a Teflon™ coated glass cloth directly to the anvil of Comparative Example A with a pressure sensitive adhesive.

This back-up pad was used to form lap seals in a Hayssen VFFS machine having the general configuration shown in FIG. 7. When Film A was used, the operation temperature range was determined to be 270° F. to 330° F. (132° C. to 165° C.). When Film B was used, the operation temperature range was determined to be 240° F. to 330° F. (115° C. to 165° C.).

The operating temperature range of Comparative Example C was greater that the operating temperature ranges of Comparative Examples A and B. These results suggest that the harder surface of the pad used in Comparative Example C was desirable. However, it is noted that the tests conducted in Comparative Example C were only of short duration, where the heat insulating properties of the pad were not a substantial factor. For longer sealing operations, the heat insulating properties of the pad used in Comparative Example C would be insufficient, especially in commercial scale operations.

COMPARATIVE EXAMPLE D

A one-layer back-up pad, having a single layer of a Velcro™ strip, was formed by affixing a layer of a Velcro™ strip directly to the anvil of Comparative Example A with a pressure sensitive adhesive. The Velcro™ strip had a surface of small hooks, and the strip was attached to the anvil in a manner such that the hooks faced outward, away from the anvil surface.

This back-up pad was used to form lap seals in a Hayssen VFFS machine having the general configuration shown in FIG. 7. When Film A was used, the operation temperature range was determined to be 270° F. to 280 (132° C. to 138° C.). When Film B was used, the operation temperature range was determined to be 240° F. to 280° F. (115° C. to 138° C.).

COMPARATIVE EXAMPLE E

A two-layer back-up pad, having a layer of a Velcro™ strip and a layer of a Teflon™ coated glass cloth, was formed by first affixing a Velcro™ strip to the anvil of Comparative Example A by a pressure sensitive adhesive. The Velcro™ strip had a surface of small hooks, and the strip was attached to the anvil in a manner such that the hooks faced outward, away from the anvil surface. The hook surface of the Velcro™ strip was then affixed to a Teflon™ (i.e. polytetrafluoroethylene) coated glass cloth by a pressure sensitive adhesive.

This back-up pad was used to form lap seals in a Hayssen VFFS machine having the general configuration shown in FIG. 7. When Film A was used, the operation temperature range was determined to be 270° F. to 280° F. (132° C. to 138° C.). When Film B was used, the operation temperature range was determined to be 240° F. to 310° F. (115° C. to 154° C.).

EXAMPLE 1

A two-layer back-up pad 110 as shown in FIGS. 7 and 8 was formed by affixing a polycarbonate bar 118 to anvil 112 by a pressure sensitive adhesive. The other surface of the polycarbonate bar 118 was then affixed to a slip layer 116 with a pressure sensitive adhesive. The slip layer was made from a Teflon™ (i.e. polytetrafluoroethylene) coated glass cloth.

This back-up pad was used to form lap seals in a Hayssen VFFS machine having the general configuration shown in FIG. 7. When Film A was used, the operation temperature range was determined to be 270° F. to 330° F. (132° C. to 165° C.). When Film B was used, the operation temperature range was determined to be 250° F. to 330° F. (121° C. to 165° C.).

The heat insulating properties of the pad used in Example 1 was sufficient for sealing operations of long duration, including those of commercial scale.

What is claimed is:

1. An apparatus for longitudinally sealing a tube formed from polymeric plastic sheet film material, comprising a sealing die and a back-up plate between which layers of polymeric film pass for forming a seal between the film layers, the sealing die having a sealing face and the back-up plate having an anvil surface that opposes the sealing face of the die, the apparatus further including a back-up pad over the anvil surface of the back-up plate, the back-up pad having a slip layer and a polymeric support layer, the support layer being on the anvil surface of the back-up plate, the slip layer opposing the sealing face of the die so that said layers of film material pass between the sealing die and the back-up pad during seal formation, the polymeric support layer comprising a polymeric material with a Shore-A hardness of at least 10 at 20° C. and a dynamic loss tangent of less than 0.1 from 20° C. to 80° C.

2. An apparatus according to claim 1, wherein said slip layer is a glass cloth coated with polytetrafluoroethylene.

3. An apparatus according to claim 2, wherein said polymeric support layer is a layer of polycarbonate.

4. An apparatus according to claim 1, wherein said polymeric support material comprises a polymer selected from the group consisting of polycarbonate, an alloy of polycarbonate and polyethylene terephthalate, an alloy of polycarbonate and polytetrafluoroethylene, glass fiber reinforced epoxy and glass fiber reinforced polyester.

5. An apparatus according to claim 4, wherein said polymeric support layer is a bar of polycarbonate, which is affixed to the anvil surface of said back-up plate by a pressure sensitive adhesive.

* * * * *